United States Patent [19]

Spoel et al.

[11] Patent Number: 5,599,379
[45] Date of Patent: Feb. 4, 1997

[54] APPARATUS AND METHOD FOR RECOVERING NON-FERROUS METALS FROM HOT DROSS

[76] Inventors: Han Spoel, 210 MacPherson Avenue, Toronto, Ontario, Canada, M5R 1W8; William A. Zebedee, 4798 S. Chipping Glen, Bloomfield Hills, Mich. 48302

[21] Appl. No.: 412,987

[22] Filed: Mar. 29, 1995

[51] Int. Cl.$^6$ .......................... C22B 21/00; C21D 11/00
[52] U.S. Cl. .................. 75/378; 75/672; 266/80; 266/87; 266/89; 266/207; 266/227
[58] Field of Search ............... 75/378, 672; 266/80, 266/87, 89, 207, 227

[56] References Cited

U.S. PATENT DOCUMENTS

| | | |
|---|---|---|
| 935,793 | 10/1909 | Kinnear . |
| 969,253 | 9/1910 | Diack . |
| 2,481,591 | 9/1949 | Heilman et al. . |
| 2,754,199 | 7/1956 | Stroup et al. . |
| 3,199,853 | 8/1965 | Olsen . |
| 4,097,027 | 6/1978 | Michel ........................ 266/44 |
| 4,251,267 | 2/1981 | Beggs et al. ................. 75/304 |
| 4,386,956 | 6/1983 | Roth et al. . |
| 4,637,591 | 1/1987 | McMahon et al. . |
| 4,842,255 | 6/1989 | Innus et al. . |
| 4,952,237 | 8/1990 | Dube et al. . |
| 5,122,181 | 6/1992 | Dube et al. . |
| 5,135,565 | 8/1992 | Gens . |
| 5,203,908 | 4/1993 | Lindsay et al. . |
| 5,245,627 | 9/1993 | Drouet . |

Primary Examiner—Melvyn Andrews
Attorney, Agent, or Firm—Harness, Dickey & Pierce

[57] ABSTRACT

Method and apparatus for recovering free aluminum from a metal bearing dross containing free aluminum metal and oxides of the metal. Hot dross is collected from a hot dross source into a vessel, and the vessel is placed into a sealable storage container. The storage container is insulated to maintain heat generated by the hot dross within the interior of the storage container to maintain the dross at or near its temperature when first placed in the storage container. An inert gas is then introduced into the container to purge the container of all gasses other than the inert gas. The inert gas reduces thermiting of the hot dross and limits the cooling of the hot dross in order to maintain the hot dross at an elevated temperature while the hot dross remains in the storage container. The dross is then removed from the vessel and introduced dross into a dross processing device such as a furnace.

14 Claims, 4 Drawing Sheets

APPARATUS AND METHOD FOR RECOVERING NON-FERROUS METALS FROM HOT DROSS

This invention relates generally to a method and apparatus for recovering metals from dross, and, more particularly, to a method and apparatus for maintaining hot dross skimmed during an aluminum fabrication process at an elevated temperature for an extended period while limiting thermiting in order to accumulate a sufficient amount of hot dross for batch processing in a rotary furnace.

BACKGROUND OF THE INVENTION

During the production of base metals, particularly aluminum metal, various oxides, nitrides, and carbides form during the melting processing and create a byproduct known as slag or dross. When dross forms, it contains byproducts other than the desired metallic end product or base metal, but may also contain between 30% –70% of the base metal, depending on the particular process and type of furnace. While it is primarily desirable to remove the dross and separate it from the molten base metal, it is also desirable to then recover as much base metal as possible from the removed dross. Indeed, plants which remelt the base metal have found that recovering metal from the dross can significantly increase the overall output of the production process.

In the aluminum production process, dross floats on top of the molten aluminum in the production furnace. When skimmed from the production furnace, the temperature of the dross typically ranges between 1,300° to 1,800° fahrenheit (F). Dross at such elevated temperatures tends to react with moisture, resulting in various emissions and odor considerations. Further, the aluminum base metal in the hot dross often reacts immediately with the surrounding atmosphere and burns or thermites. The temperature of the thermiting dross can reach approximately 3,000° F. and can consume approximately 1% of the aluminum by-weight per minute.

Traditional techniques directed to cooling the aluminum dross often require expensive equipment and are marginally effective at accommodating the hot dross at the above-discussed elevated temperatures. Further, because the hot dross cannot practically be transported from the metal production site to a remote dross processing site, the dross typically must be cooled at the metal production site.

While this process enables limited recovery of the base metal, the desire to increase residual aluminum recovered from the dross has required procedures which provide more effective recovery of the base metal than provided by processes which merely allow the dross to burn itself out. Consequently, salt may be added to the dross to expedite the cooling process and reduce thermiting in an effort to improve the metal recovery process significantly. In a variation of the dross cooling process, dross is spread in a shed so that the emitted exhaust may be collected and processed in a contained environment, thereby eliminating any emissions into the atmosphere.

Another approach to processing hot dross involves first cooling then harvesting the cooled, hardened dross using the methods described above. The harvested dross is then reheated in a rotary or plasma furnace in order to separate the base metal (typically aluminum) from the dross. One major disadvantage of this approach is that significant energy is expended by reheating the cooled dross. A variation of this dross handling process limits the energy loss resulting from cooling the hot dross by processing the hot dross at the first available opportunity. This significantly reduces the time available for thermiting, decreases the time for fugitive emissions thereby significantly decreasing the quantity of such fugitive emissions, and reduces the energy costs associated with reheating the cold dross.

There are several disadvantages, however, in processing hot dross immediately after it is skimmed. First, rotary furnaces typically used to process the hot dross operate more efficiently when processing large batches of dross, rather than the quantity of dross yielded by a single typical skimming operation. Second, irregular skimming periods limit effective batch processing because the skimmed dross currently cannot be stored for a sufficient time to accumulate a suitable quantity of material for efficient batch processing. Third, the dross processing furnaces must be in relatively close proximity to the dross producing sources. More particularly, because most existing facilities make use of a rotary type furnace, dross processing is further complicated. These furnaces are particularly susceptible to the inherent disadvantages described above because they require a large batch of dross for efficient operation.

Thus, it would be highly desirable to provide a dross processing apparatus and method in which hot dross can be stored at an elevated temperature in order to accumulate a sufficiently large batch of dross to effect efficient processing by a dross processing furnace. It would also be highly desirable to provide a method and apparatus for storing hot dross which does not permit appreciable cooling of the dross prior to charging it into a processing furnace, and which further substantially reduces or eliminates thermiting while the hot dross is being held prior to being charged into a furnace.

SUMMARY OF THE INVENTION

A method and apparatus for recovering free aluminum from a metal bearing dross containing aluminum metal and oxides of the metal. The method of the present invention includes the steps of collecting hot dross from a hot dross source into a vessel and placing the vessel into a generally sealable storage container. The storage container is insulated to maintain heat generated by the hot dross substantially within the interior of the storage container, and thus maintains the dross at, or substantially close to, the temperature at which it is when first deposited in the storage container. An inert gas, such as argon, is then introduced into the container to substantially purge the container of all gasses other than the inert gas, the inert gas substantially preventing the hot dross from thermiting, thereby limiting the cooling of the hot dross in order to maintain the hot dross at a substantially elevated temperature while the hot dross remains in the storage container. The dross is then removed from the vessel and introduced into a dross processing device such as a furnace.

The apparatus of the present invention generally comprises the sealable storage container for temporarily storing the hot dross until same is to be charged into a furnace. In a preferred embodiment the container includes a means for admitting an inert gas therein and means for monitoring the temperature within the storage container.

Additional objects, advantages, and features of the present invention will become apparent from the following description and appended claims taken in conjunction with the accompanying drawings.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE DRAWINGS

Figure 1:
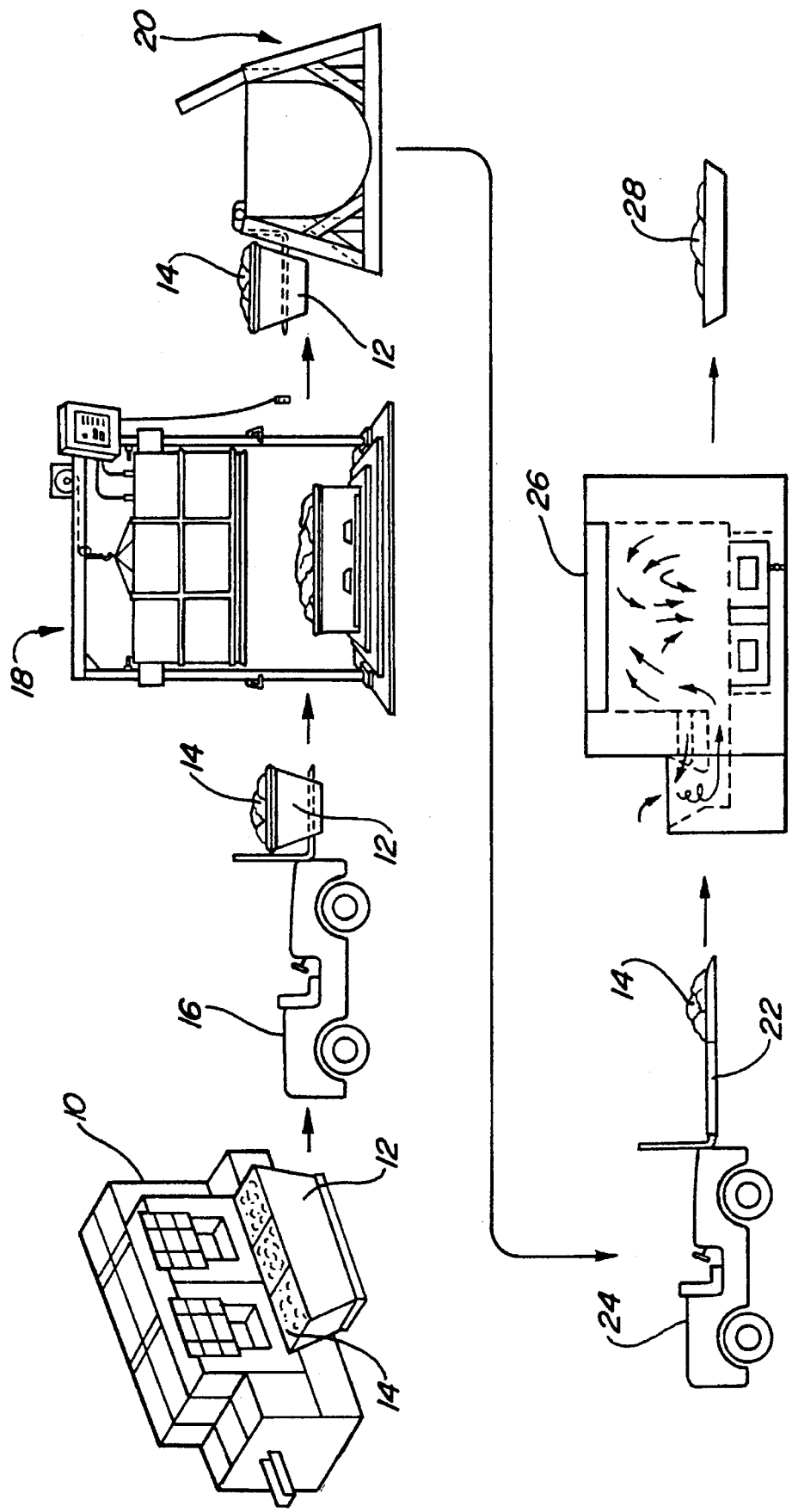
FIG. 1 is a diagrammatic sketch of the various stations in the dross handling process.

FIG. 1 depicts a general diagrammatic view of the dross handling process according to the principles of the present invention. In FIG. 1, a holding or batching furnace 10 produces in its normal course of operation a base metal (such as aluminum) and a hot dross, which is typically skimmed off the top surface of a pool of molten metal into a dross pan 12, which is transportable by a fork lift 16. Skimming frequency typically varies from once every few hours to once every 24 hours, depending on furnace conditions and plant operating requirements which are generally determined by the casting house, but may not be optimized for recovery of metal from the dross. The hot dross 14 in dross pan 12 is transported via a fork lift 16 and placed into a selected one of a plurality of containers 18, to be described further in detail with respect to FIG. 2. Each container 18 preferably stores one dross pan 12, and a plurality of containers 18 preferably provide storage for the plurality of dross pans 12 each of which are stored in the containers 18 in order to maintain the dross at a substantially elevated temperature until the dross 14 accumulates in amounts sufficient for batch processing. Storing multiple dross pans 12 enables processing large batches of dross at one time, rather than smaller, independent quantities of dross over an extended period of time.

Once a sufficient quantity of dross has been accumulated through storage in the containers 18, a fork lift 16 lifts each dross pan 12 and transports each dross pan 12 to a dross transfer vessel 20. The dross accumulator 20, to be described further with respect to FIG. 5, facilitates transfer of the dross 14 from the dross pan 12 to a rotating head scoop 22 affixed to a forklift 24. The dross accumulator 20 is preferably designed to facilitate emptying dross 14 from dross pan 12 into the dross accumulator 20 and to facilitate the scooping of the dross 14 by the rotating head scoop 22 affixed to forklift or front end loader 24. Forklift 24 then transports the dross scooped by rotating head scoop 22 and introduces the dross 14 into a rotary furnace 26. The rotary furnace 26 processes the dross 14 in order to separate the molten metal 28 from other byproducts yielded by the metal producing process.

Figure 2:
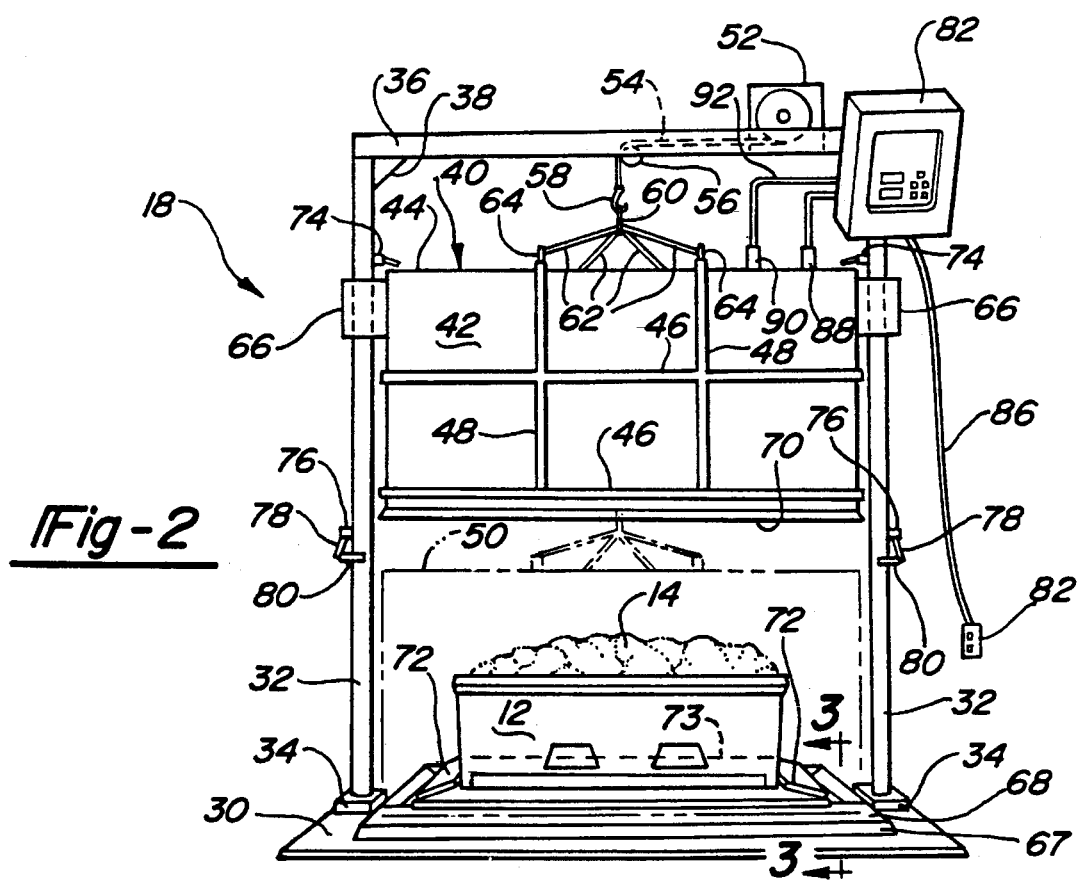
FIG. 2 depicts the container into which a dross holding vessel is inserted so that a positive flow of argon may be initiated to maintain the dross at a substantially elevated temperature once the container is closed.

FIG. 2 depicts a representative configuration of the container 18 having inserted therein a dross pan 12 containing dross 14. The dross container assembly 18 includes a substantially stable foundation 30 into which vertical posts 32 are securely fastened via bases 34. The posts preferably extend approximately 12 feet vertically, to enable sufficient clearance for dross pan 12 and the dross 14 therein, and are joined at their upper end using a horizontal support 36 and cross braces 38. Disposed between the vertical posts 32 is a cover 40. Cover 40 may best be described as a bottomless box having side walls 42 and top surface 44. The side walls 42 and top surface 44 preferably are plate steel and include refractory material to insulate the interior of the cover 40, thereby increasing the heat retaining capacity of container 18. Horizontal steel channels 46 disposed about the periphery of cover 40 provide, in conjunction with vertical channels 48, structural support for cover 40. Steel channels 46 and 48 also provide structural support to maintain rigidity of cover 40 so that cover 40 may be raised and lowered between a closed position 50 (shown in phantom) and a raised position. A winch 52 provides mechanical advantage via a chain 54 and pulley 56 for raising and lowering cover 40. A hook 58 at the end of chain 54 engages a tang 60 which in turn engages four chains 62 to form an integral upward lifting arrangement. The chains 62 in turn engage tangs 64 which are rigidly affixed to a cross bar positioned on top surface 44 which is rigidly attached to vertical channels 48.

When cover 40 is raised and lowered, the vertical posts 32 provide both alignment and guidance to accommodate the motion of cover 40. Cylindrical or triangular guides 66 encircle vertical posts 32 rigidly attach to the sidewalls 42 of cover 40 which face their respective vertical posts 32, preferably using welds or fasteners, to limit sway and swinging motion of cover 40 as the same is lifted and lowered. The cover 40, through the activation of winch 52, is lowered onto a raised lip 68 of a cement base 67, which is preferably constructed of refractory cement material to provide both support and additional insulation to the closed container 50 resulting when cover 40 is lowered onto raised lip 68. The base 67 includes the raised lip 68 which engages a correspondingly shaped open ended seal channel 70 in order to limit the escape of air from the interior of the container 18 when cover 40 is in the lowered position 50. Base 67 includes a pair of vertically raised guide channels 72 which angle inwardly on the sides of base 67. A third channel 73 (indicated in phantom) spans guide channels 72 and functions as a rear butt plate for dross pan 12. The guide channels 72 and rear butt plate 73 ensure proper alignment of dross pan 12 on base 67 so that when cover 40 is lowered to the closed container 50 position, dross pan 12 does not interfere with the raising and lowering of cover 40.

Also associated with vertical posts 32 are limit switches 74 which contact the top surface 44 of cover 40 when winch 52 raises cover 40 to a predetermined level. Contact with limit switches 74 preferably deactivates winch 52 to prevent overraising of cover 40. Also associated with vertical post 32 is a pair of solenoids 76 having lever arms 78. The lever arms 78 are coupled to support pins 80 such that when energized in a first state, the solenoids 76 displace lever arms 78 inwardly, 30 thereby causing support pins 80 to move inwardly. Thus, when cover 40 is in a raised position and solenoids 76 are energized in a first state to inwardly displace support pins 80, support pins 80 prevent undesired lowering and provide additional support to that provide by chain or cable 54 and winch 52.

A controller 82 directs movement of cover 40 as well as other control functions of container 18. Controller 82 may be any number of programmable electronic controllers, including a microprocessor, a programmable logic array (PLA), or any other suitable controller well known in the art. Controller 82 includes a pendant 84 which is suspended from controller 82 by control cable 86. Typically, vertical posts 32 extend about 12 feet vertically, and the suspension of pendant 84 enables the user to operate controller 82. Controller 82 monitors the internal pressure and temperature of the container 18 through an integral pressure and temperature sensor 88 which provides electrical sensor signals to controller 82. Further, controller 82 modulates the flow of argon gas input to the interior of cover 40 through an argon gas line 92 and a fitting 90. When cover 40 is lowered to provide the closed container position 50 to house dross pan 12 containing hot dross 14, argon gas is introduced through argon gas hose 92 and argon gas fitting 90. Introducing argon gas substantially prevents thermiting of the hot dross which would otherwise occur when dross at a sufficiently elevated temperature resides in an atmosphere containing oxygen. The argon gas prevents such thermiting which limits consumption of the aluminum contained in the dross 14.

Figure 3:
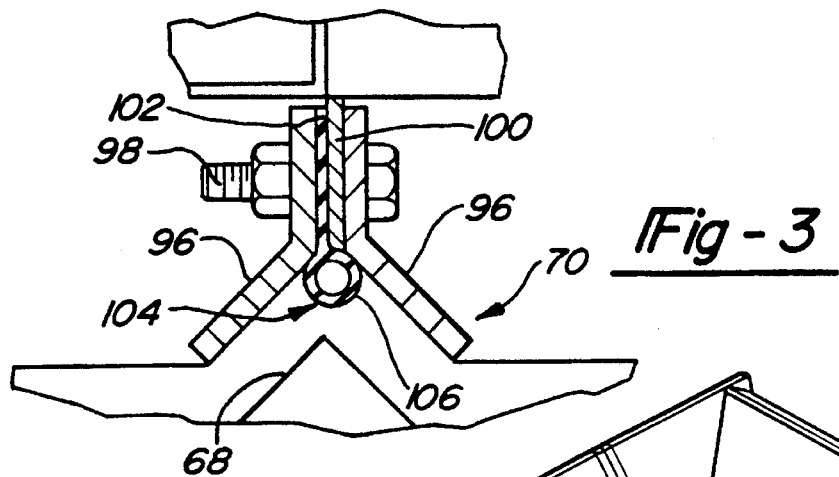
FIG. 3 depicts a cross-sectional view in accordance with section line 3—3 in FIG. 2 of the seal of the top portion of the container and its interaction with the raised lip of the base of the container when the cover is in its closed position, as indicated in phantom in FIG. 2.

As described above, seal channel 70 engages a raised lip 68 of base 67. FIG. 3 depicts an enlarged view of this lip 68 and seal channel 70 interaction. As can be seen in FIG. 3, the raised lip and seal channel 70 are substantially triangular and similar in shape. Seal channel 70 sits atop raised lip 68 to trap a rope seal 104 therebetween providing a substantially airtight seal between the interior and exterior of the closed container 50. The seal channel 70 is comprised of two angled steel plates 96 which are bolted together with nut and bolt combination 98. The nut and bolt combination 98 also bolts to a descending plate 100 which is integrally connected to side walls 42 of cover 40. Such a configuration yields an assembly which is integral with the container wall 42 and seal channel 70. Nut and bolt combination 98 also fastens between one angled plate 96 and descending plate 100 a tail 102 of a rope seal 104. A seal portion 106 of rope seal 104 seats snugly into the intersecting region of angled plates 96. When raised lip 68 engages seal channel 70, the upper portion of raised lip 68 contacts the seal portion 106 of rope seal 104, thereby forming a substantially air-tight arrangement. In this manner, when argon gas is introduced at a high flow rate into the container assembly 18 to flood the interior of cover 40 when lowered to the closed position 50. After the initial flooding with argon gas, a reduced argon flow rate provides a positive pressure inside the closed cover 40. The positive pressure is then maintained to ensure that substantially no oxygen will be introduced into the sealed container assembly 18.

Figure 4:
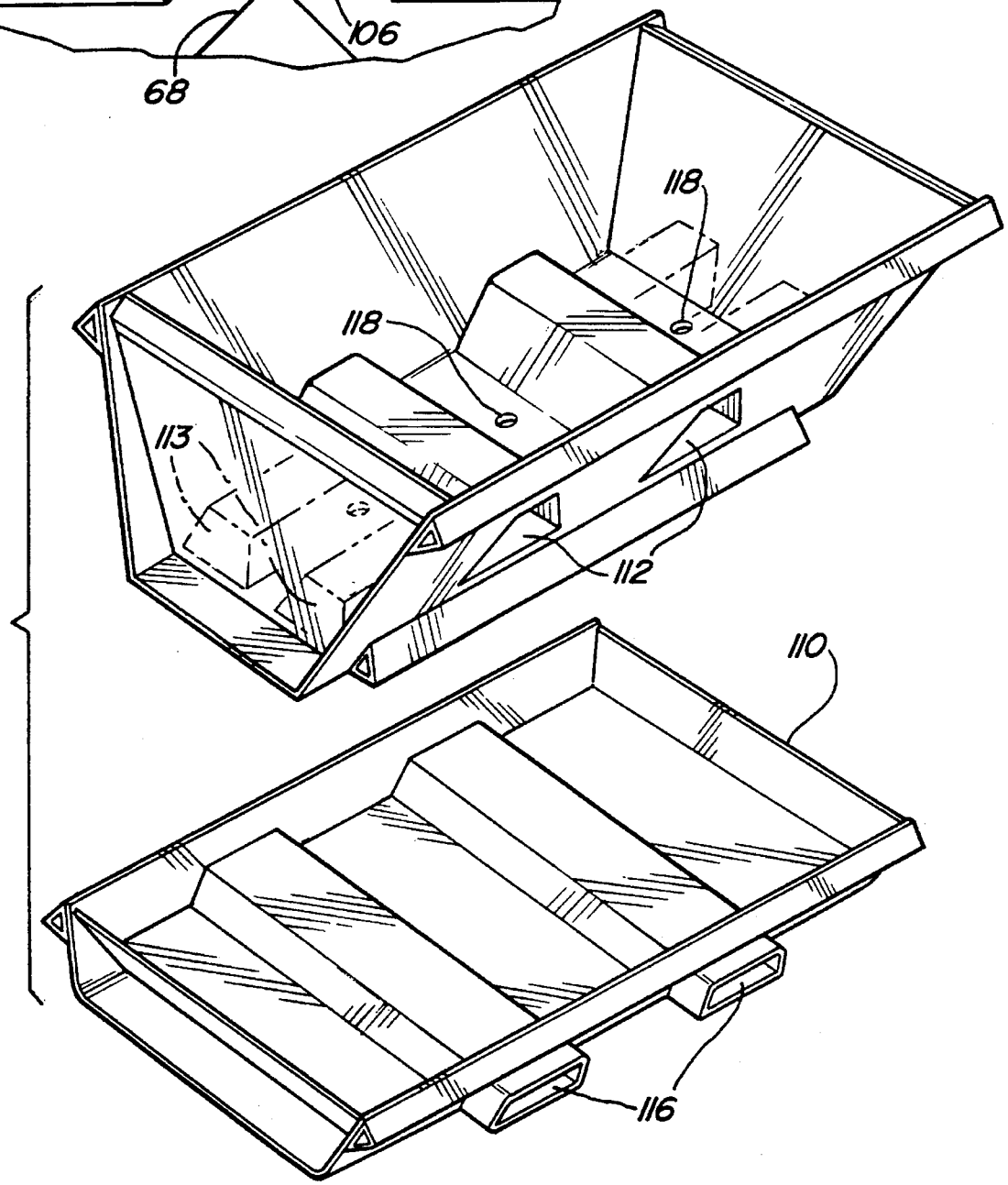
FIG. 4 depicts an exploded perspective view of the dross holding vessel placed onto a bottom pan.

Referring to FIG. 4, a perspective view of the dross pan 16 and a supporting bottom pan 110 demonstrate one exemplary embodiment of a top and bottom pan arrangement. Top pan 12 and bottom pan 110 include open channels 112 and 116, respectively, for receiving the tines of a forklift to facilitate cartage by a forklift. Dross pan 12 thus sits atop bottom pan 110 so that both may be transported by engaging channels 116 with the tines of a forklift.

Although dross pan 12 preferably inhibits draining of molten base metal, dross pan 12 may alternatively include drain holes 118 so that molten aluminum which separates from the dross 14 can flow from dross pan 12 into bottom pan 110. In operation, the dual pan design enables lifting the dross pan 12 and bottom pan 110 integrally by engaging the open channels 116 with tines of a forklift (not shown). In this manner, both dross pan 12 and bottom pan 110 can be integrally transported. Further, having a set of open channels 112 on dross pan 12 enables engaging a second set of tines with open channels 112 to hold the upper dross pan 14. After tines engage open channels 112, bottom pan 110 may be lowered away from dross pan 12. It will be understood by one skilled in the art that bottom pan 110 may be optionally omitted from specific embodiments. In such a case, alternative lifting methods known to one skilled in the art may be used to lift dross pan 112.

Figure 5:
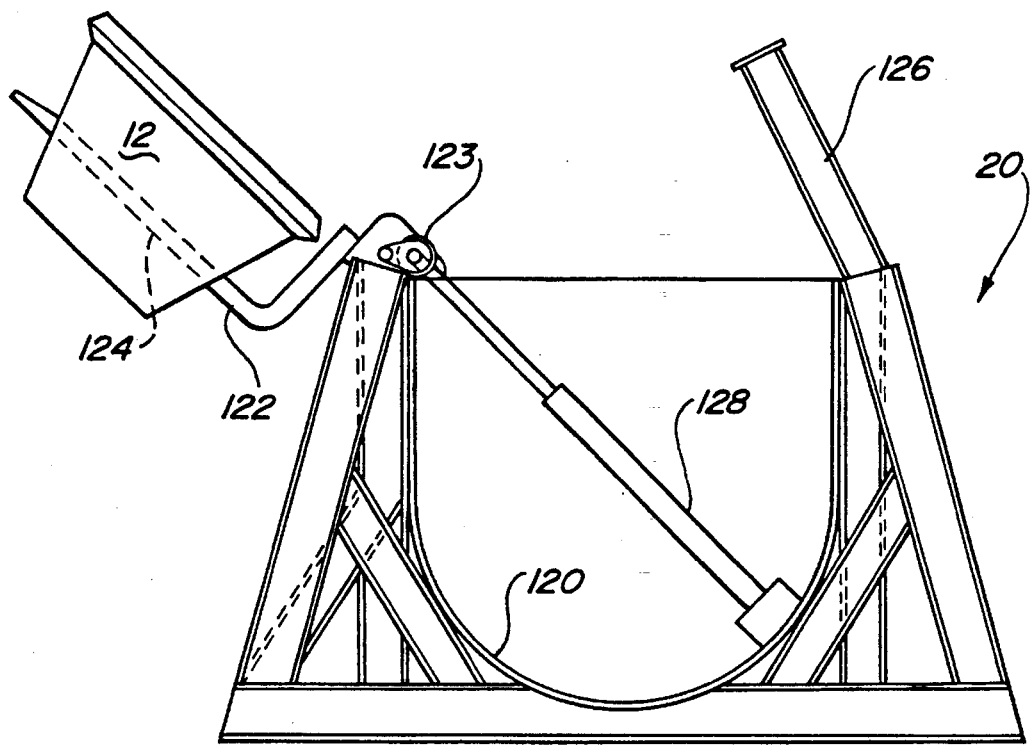
FIG. 5 depicts a perspective view of a dross accumulator which enables transfer of the dross from the dross pan to the furnace.

FIG. 5 depicts the dross accumulator 20 which is operable for transferring the dross 14 from the dross pan 12 to a container more suitable for charging the dross processing furnace 26. The dross accumulator 20 includes a hopper 120 which receives dross 14 when emptied from dross pan 12. Dross 14 is transferred by inserting tines 124 of a dross pan support 122 into the openings 112 of dross pan 12 to support dross pan 12. The support 122 is pivotable about an axis 123 and is pivoted by a hydraulic ram 128, which is aided by a counterbalancing device (not shown), or other devices known in the art, to invert dross pan 12 so that the dross 14 falls from the open end of dross pan 12 into hopper 120. To facilitate more complete emptying of the dross pan 12, the dross pan 12 is positioned so as to eventually topple and strike an end stop 126 to jar the dross from dross pan 12. To further facilitate emptying dross from dross pan 12, a hydraulic ram 128 raises dross pan 12 from end stop 126, then is released so that dross pan 12 again strikes end stop 126. Repeated strikings of end stop 126 with dross pan 12 ensures that substantially all dross 14 will be emptied from dross pan 12.

It will be understood by one skilled in the art that dross accumulator 20 provides a suitable means for transferring dross from dross pan 12 to ultimate introduction to rotary furnace 26. However, dross pan 12 may be preferably omitted by providing a design enabling the direct transfer of dross from dross pan 12 to dross processing furnace 26. One possible approach to such direct charging is providing longitudinal channels (not shown) in dross pan 12 which may be engaged by tines of a fork truck 24 through openings 113 (shown in phantom) in the side of dross pan 12. In this manner, the tines of forklift 16 may engage openings 112 to carry out the skimming operation and to transport dross pan 12 to and from the container. When charging the dross processing furnace 26, however, the tines of a forklift 24 may engage openings 113 so that the dross pan 12 may be inserted into the dross processing furnace 26 for direct charging from dross pan 12. In order to effect such an operation, rather than attaching a rotating scoop 22 to forklift 24 a device for enabling rotation of the tines may be substituted for rotating head scoop 22 on forklift 24. Such an arrangement facilitates the transfer of dross from the dross pan 12 into dross processing furnace 26.

Figure 6:
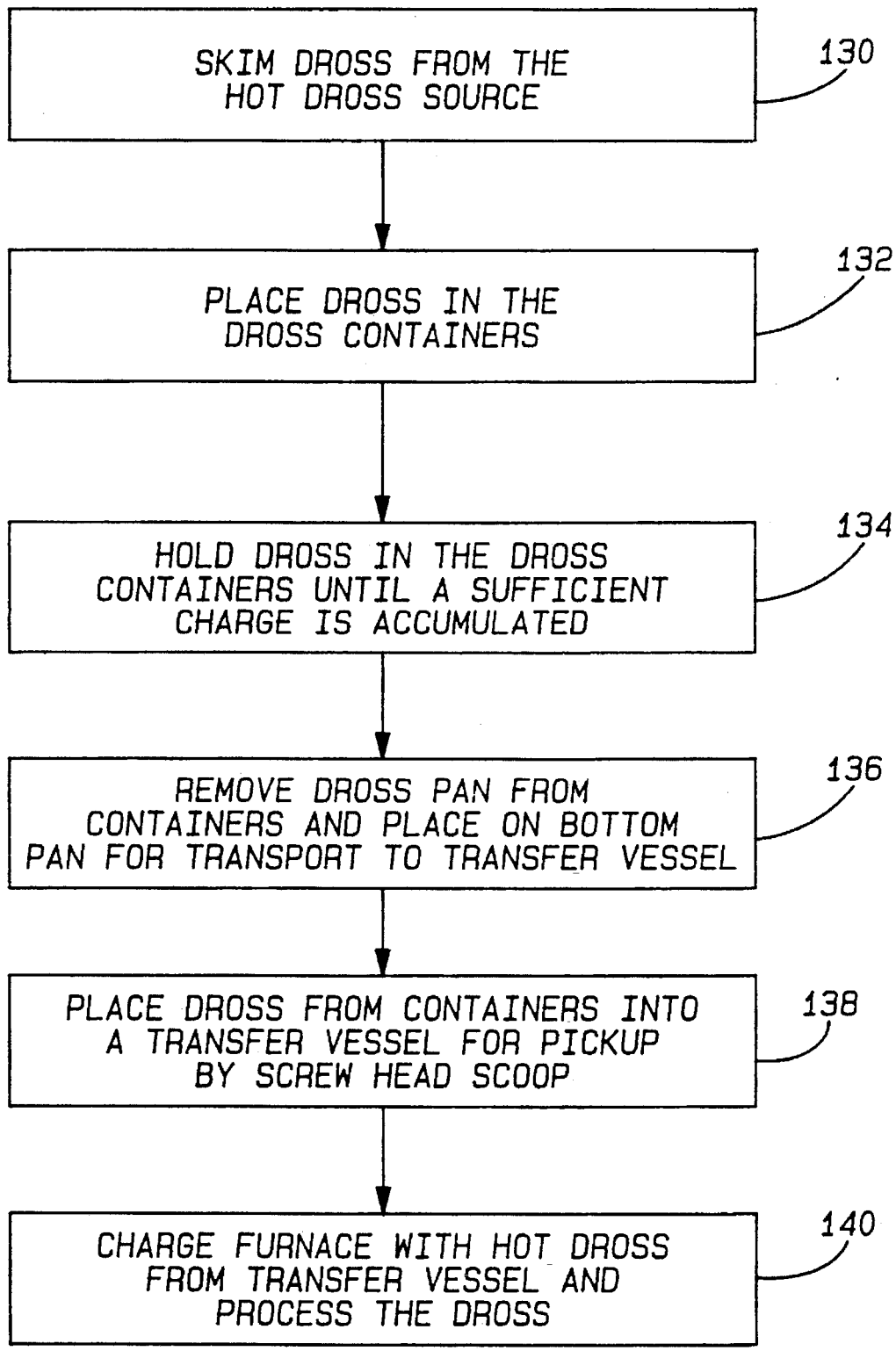
FIG. 6 depicts a flow chart of the dross recovery process.

FIG. 6 depicts a flow diagram of the metal recovery process used to extract metal from the dross. Referring to FIG. 6, block 130, the process starts by skimming the hot dross from a hot dross source such as the metal processing furnace 10 of FIG. 1. The dross would be typically skimmed using an arrangement well known to one skilled in the art. At block 132, the forklift 16 transports dross pan 12 containing dross 14 and places the dross pan 12 into the dross container assembly 18. When the dross pan 12 is placed into the container assembly 18, an operator uses pendant 84 to initiate lowering of cover 40, which upon completion activates operation of controller 82.

As indicated at block 134, during the operation of controller 82, the operator lowers the cover 40 over the dross pan 12 so that raised lip 68 engages the seal channel 70 providing a substantially air-tight seal. After cover 40 is lowered, controller 82 enables the introduction of argon gas into the closed interior of the container 18 at a high flow rate through argon gas hose 92 and fitting 90 to flood the interior of closed container 50 with argon gas. The argon gas flow is then reduced to a pressure sufficient to maintain a positive pressure within the interior of closed container assembly 18 when closed, thereby preventing the introduction of oxygen from the exterior of closed container 18.

The argon gas is typically continuously supplied until controller 82 directs the raising of cover 40 and dross pan 12 is removed from container base 67. Typically, a plurality of containers are supplied to hold a corresponding plurality of dross pans 12 until a sufficient amount of dross 14 is accumulated in the plurality of dross pans 12 in order to charge a dross processing furnace with a full batch of dross. By placing the dross pan 12 having dross 14 in the container 18, 30 closing the container 18, and introducing argon gas, thermiting of the dross is substantially reduced. Further, because container base 67 and container cover 40 preferably include substantial amounts of refractory material to insulate the interior of the closed container assembly 18 and maintain the dross at a substantially elevated temperature, when a full charge of dross is introduced into the dross processing furnace 26 (FIG. 1), substantially less energy is required from the dross processing furnace 26 to elevate the dross to a temperature suitable for recovering metal from the dross. Thus, the container assembly 18 provides two functions, limiting the thermiting of the dross through introduction of argon gas and maintaining the dross at a substantially elevated temperature through the insulating properties of the container 18.

It will be appreciated that maintaining the dross at, or close to, the temperature it is when first skimmed results in a significant cost savings because the dross does not have to be re-heated to a suitable temperature to effect recovery of free aluminum from the dross. Thus, the amount of energy required to operate the furnace 26 is considerably less as a result of significantly shorter residence times of any quantity of dross in the furnace 26 to remove the free aluminum. Further, the salt required to carry out the process is substantially reduced as well. It is anticipated that the apparatus and method of the present invention could result in cost savings (in energy and materials) of about 35–60% over that which would otherwise be incurred using conventional dross processing apparatuses and methods.

As indicated at block 136, after a full charge of dross is accumulated the cover 40 is raised and a forklift is used to lift 30 dross pan 12 and place dross pan 12 onto bottom pan 110. The forklift then lifts bottom pan 110 and supported dross pan 12. The forklift operator then aligns the tines 124 of dross support 122 with the openings 112 of dross pan 12 so that the tines engage and support dross pan 12. The forklift then is lowered to remove bottom pan 110 from supported dross pan 12, which is now supported on the tines 124 of dross accumulator 20. As described with respect to FIG. 5, the support 122 of dross accumulator 20 is then rotated upwardly to invert the dross pan 12 and empty the dross 14 into hopper 120. Preferably, the hydraulic ram 128 extends and retracts to effect a jogging of dross pan 12 against dross pan stops 126. The above-described process of placing dross pan 12 on the tines 122 of fork 124 is then repeated for each dross pan 12 containing dross 14 to charge dross processing furnace 26.

As indicated at block 136, the dross 14 in the dross accumulator 20 is then scooped up using a rotating head scoop 22 integrally attached to a forklift 24, as shown in FIG. 1. The forklift 24 is then operated to charge the dross processing furnace 26 with the hot dross from the dross accumulator 20 for processing the dross, as indicated at block 140 of FIG. 6.

It will be understood by one skilled in the art that there are several variations which could be implemented to transfer the dross 14 from dross pan 12 directly to a dross processing furnace 26. For example, if the dross processing furnace were a rotary furnace, the rotary furnace could be tilted upwardly so that the charge opening is oriented in an upward direction. The dross pans then could be shaped and a dross accumulator could then be fashioned so that a variation of dross pan 12 could be arranged on a dross accumulator so that the dross is then emptied from a dross pan directly into the dross processing furnace in order to charge the furnace.

It is to be understood that the invention is not limited to the exact construction illustrated and described above, but that various changes and modifications may be made without departing from the spirit and scope of the invention as defined in the following claims.

We claim:

1. A method for recovering free aluminum from a metal bearing dross containing free aluminum metal and oxides of the metal, comprising the steps of:

collecting into a vessel hot dross from a hot dross source in a vessel;

placing the vessel in a generally sealable storage container substantially immediately after collecting the hot dross in the vessel and sealing the storage container, the storage container being insulated to maintain heat generated by the hot dross substantially within an interior of the storage container;

introducing an inert gas into the container to substantially purge the container of all gasses other than the inert gas, the inert gas substantially impeding the hot dross from thermiting and thereby limiting the cooling of the hot dross to maintain the hot dross at a temperature suitable to effect recovery of said free aluminum while the hot dross remains in the storage container; and removing the vessel containing hot dross from the storage container and introducing the hot dross into a dross processing device while said dross is at a temperature suitable to enable recovery of said free aluminum.

2. The method as defined in claim 1 further comprising the step of providing a plurality of vessels and associated storage containers in order to accumulate a plurality of hot dross containing vessels for generally simultaneous batch processing.

3. The method as defined in claim 1 further comprising monitoring the pressure within the storage container and maintaining a positive pressure within the storage container by maintaining the flow of the inert gas into the storage container, thereby insuring an atmosphere substantially formed of inert gas within the storage container.

4. The method as defined in claim 1 wherein the step of collecting hot dross from the hot dross source further comprises skimming an upper surface of a pool of molten aluminum to skim the hot dross off the upper surface of the pool of said molten aluminum.

5. The method as defined in claim 1 further comprising the step of providing drain holes in the vessel to allow molten aluminum to flow out of the vessel.

6. The method as defined in claim 5 further comprising the step of providing a lower vessel on which the vessel is disposed, the lower vessel collecting material which may flow out of the vessel through the drain holes, the vessel being disposed on the lower vessel during transport from the hot dross source to the storage container and during transport from the storage container to the dross processing device.

7. The method as defined in claim 1 wherein the inert gas comprises argon.

8. An apparatus for processing a metal bearing, hot dross to effect the recovery of free aluminum from the metal bearing, hot dross, the apparatus comprising:

a holder for receiving hot dross from a source of hot dross;

an insulated storage container into which the holder receiving the hot dross is introduced, the storage compartment being insulated to maintain the hot dross at a temperature suitable to effect recovery of the free aluminum in the dross;

a system for introducing inert gas into the storage container to provide an atmosphere within the storage container substantially formed of the inert gas, the inert gas preventing thermiting of the hot dross and assisting in maintaining the hot dross at a temperature suitable to effect recovery of the free aluminum in the dross; and a hot dross processing device for processing the hot dross following temporary storage of the dross in the insulated storage container.

9. The apparatus as defined in claim 8 wherein the holder includes drain holes which enable molten aluminum mixed with said dross to flow through the holder.

10. The apparatus as defined in claim 9 further comprising a bottom holder onto which the holder is disposed, the bottom holder collecting the molten aluminum flowing from the drain holes, the bottom holder overlapping the exterior of the holder so that dross overflowing the holder falls onto the bottom holder.

11. The apparatus as defined in claim 8 wherein the insulated storage container includes refractory material disposed within the interior of the insulated storage container to insulate the storage container.

12. The apparatus as defined in claim 8 wherein the system for introducing inert gas into the storage container comprises a system for introducing argon into the storage container.

13. The apparatus as defined in claim 8 further comprising:

a pressure sensor to monitor the pressure within an interior area of the insulated storage compartment;

a temperature sensor to monitor the temperature within the interior area of the insulated storage compartment;

a programmable logic array to monitor the pressure and temperature and to modulate the flow of the inert gas into the interior area of the insulated storage compartment.

14. The apparatus as defined in claim 13 wherein the system for introducing inert gas into the storage container comprises a system for introducing argon into the storage container.

* * * * *